United States Patent
Kimura

(10) Patent No.: US 6,611,233 B2
(45) Date of Patent: Aug. 26, 2003

(54) RADIO COMMUNICATION DEVICE AND METHOD OF MEASURING DISTANCE

(75) Inventor: Masayuki Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/878,796

(22) Filed: Jun. 11, 2001

(65) Prior Publication Data

US 2002/0014990 A1 Feb. 7, 2002

(30) Foreign Application Priority Data

Jun. 12, 2000 (JP) ............................ P2000-175871

(51) Int. Cl.[7] ................................................ G01S 3/02
(52) U.S. Cl. ...................................................... 342/458
(58) Field of Search ................................ 342/109, 118, 342/357.06, 458, 463

(56) References Cited

U.S. PATENT DOCUMENTS 5,689,269 A  11/1997  Norris ......................... 342/357
5,945,949 A  8/1999   Yun ............................ 342/447

FOREIGN PATENT DOCUMENTS

DE  19801519   7/1998   ........... G02B/23/00
GB  2277232    10/1994  ........... H04B/7/212

Primary Examiner—Dao Phan
(74) Attorney, Agent, or Firm—Jay H. Maioli

(57) ABSTRACT

A radio communication device and a method of measuring distance is capable of easily obtaining a distance and a positional relation between a portable telephone 3A and a portable telephone 3B directly, not via a base station. The portable telephone 3A directly transmits a measurement pilot signal used for calculating a distance between its current position and the portable telephone 3B, to the portable telephone 3B via a radio interface for short distance 15, receives a pilot response signal in response to the measurement pilot signal from the portable telephone 3B, and then calculates a distance between the portable telephone 3A and the portable telephone 3B based on the pilot response signal and the measurement pilot signal, thus making it possible to easily obtain a distance and a positional relation between itself and the portable telephone 3B by directly communicating the pilot response signal and measurement pilot signal with the portable telephone 3B, not via the base station.

14 Claims, 7 Drawing Sheets

RADIO COMMUNICATION DEVICE AND METHOD OF MEASURING DISTANCE

BACKGROUND OF THE INVENTION

1. Field of the Invention

The present invention relates to a radio communication device and a method of measuring a distance, and more particularly, is suitably applied to a potable telephone in a cellular digital portable telephone system.

2. Description of the Related Art

A portable telephone communicates with another terminal via a base station which is the nearest to the portable telephone. And even if the own terminal and the companion terminal exist within the same area, a base station is absolutely necessary to perform communications via.

That is, since the portable telephone does not have an interface for radio communications which is used for communicating with another terminal other than the base station, it has to communicate via the base station when communicating with a companion terminal.

By the way, such a portable telephone has to communicate with a companion terminal via the base station. Therefore, even if the terminal exists in the same area as the portable telephone at the time of meeting, the base station has to be used to call the companion terminal over a public circuit network so that they can inform each other of their positions by means of audio communications.

In addition, the portable telephone is difficult to exactly know whether the companion terminal is "getting closer" or "getting farther" while they move, which causes a problem in its usability.

SUMMARY OF THE INVENTION

In view of the foregoing, an object of this invention is to provide a radio communication device and a method of measuring a distance which offer excellent usability and are capable of easily detecting a distance and a positional relation between the device and a target for measurement.

The foregoing object and other objects of the invention have been achieved by the provision of a radio communication device which directly transmits via a radio communication means a predetermined measurement signal which is used for calculating a distance between a specific target for measurement and its current position, receives a response signal in response to the measurement signal transmitted from the target for measurement, and then calculates the distance between its current position and the target for measurement, based on the response signal and the measurement signal, so that the distance and the positional relation between the target for measurement and its device can be easily calculated by directly communicating the measurement signal and the response signal with the target for measurement, not via a base station.

In addition, in the present invention, a radio communication device directly transmits standard time information showing a transmission time toward a specific target for measurement, which is used for calculating a distance between its current position and a target for measurement, to the target for measurement, receives reception time information of the standard time information, which is transmitted from the target for measurement and then, calculates the distance between the current position and the target for measurement based on the standard time information and the reception time information. Thereby, the radio communication device can easily calculates the distance and the positional relation between the own device and the target for measurement by directly communicating the standard time information and the reception time information, not via a base station.

Furthermore, in the present invention, a radio communication device directly transmits standard time information indicating the transmission time toward a specific target for measurement, which is used for calculating a distance between its own current position and the target for measurement, to the target for measurement, receives reception time information of the standard time information, which synchronizes with the standard time information in absolute time, from the target for measurement and then, calculates the distance between the current position and the target for measurement based on the standard time information and the reception time information. Thereby, the distance and the positional relation between the own device and the target for measurement can be easily and accurately calculated by directly communicating the standard time information and the reception time information which synchronize to each other, with the target for measurement, not via a base station.

The nature, principle and utility of the invention will become more apparent from the following detailed description when read in conjunction with the accompanying drawings in which like parts are designated by like reference numerals or characters.

DETAILED DSCRIPTION OF THE EMBODIMENT

Preferred embodiments of this invention will be described with reference to the accompanying drawings:

(1) First Embodiment

Figure 1:
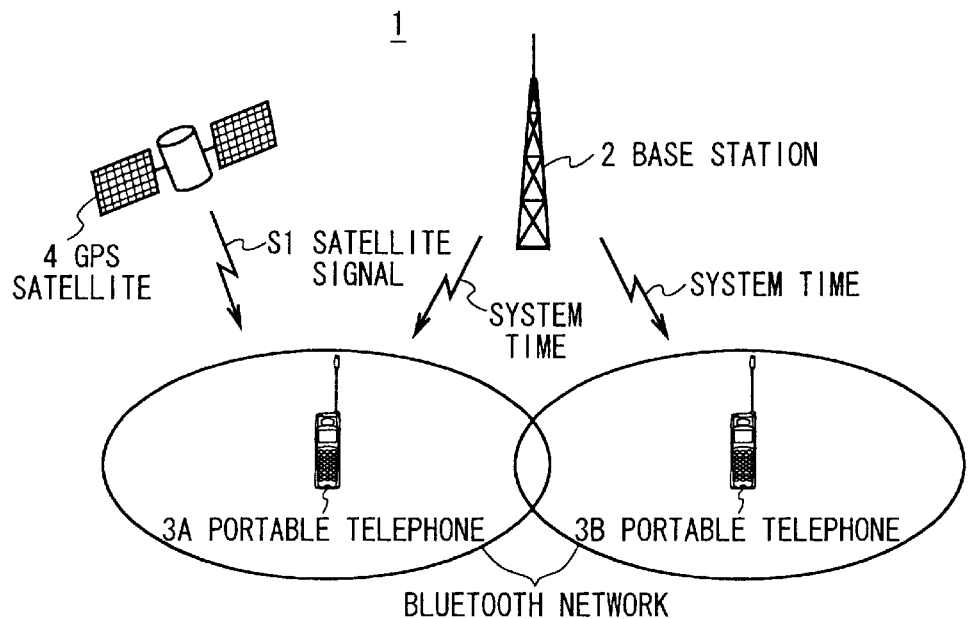
FIG. 1 is a schematic diagram showing the whole configuration of a digital portable telephone system in a first embodiment of the present invention.

In FIG. 1, a reference numeral 1 shows a cellular digital portable telephone system as a whole, which is composed of a base station 2 connected to a public circuit network, and digital portable telephones (hereinafter, referred to as portable telephones simply) 3A and 3B which communicate with each other via the base station 2 by audio.

In addition, the portable telephones 3A and 3B in the digital portable telephone system 1 can receive a satellite signal S1 which is transmitted from a global positioning system (GPS) satellite 4 rotating in orbit 20000 Km above the earth, and can directly communicate with each other by a radio communication method as a radio interface for short distance based on a bluetooth (trademark), not via the base station 2.

Here, the Bluetooth is a standard of a radio data communication for short distance which is standardized by the standardizing group, Bluetooth special interest group (SIG), in which by setting 79 channels with the band width of 1 MHz in the industrial scientific and medical equipment band (ISM band) of 2.4 GHz, data communication for short distance of about 10 m is performed at data transmission speed of 1 Mbit/sec by means of the spread spectrum communication method utilizing a frequency hopping method of changing channels 1600 times per second.

Figure 2:
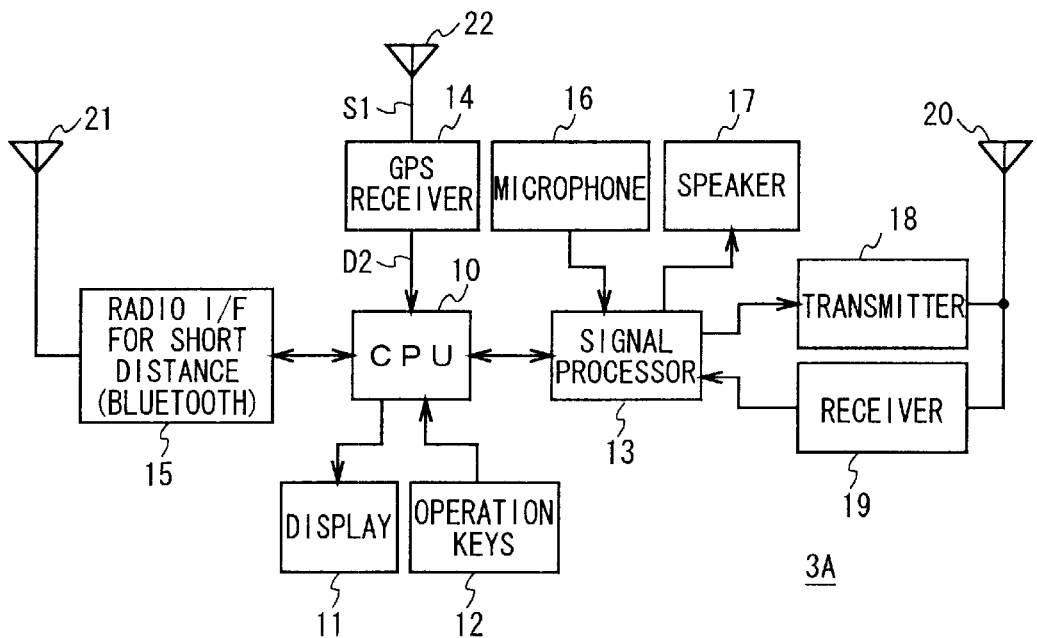
FIG. 2 is a block diagram showing the circuit structure showing the digital portable telephone.

In the portable telephone 3A as shown in FIG. 2, a display 11 which is a liquid crystal display, a plurality of operation keys 12 for inputting various commands, a signal processor 13 which is a digital signal processor (DSP), a GPS receiver 14 and a radio interface for short distance 15 based on the Bluetooth are connected to a central processing unit (CPU) 10 for controlling entire operations in the portable telephone 3A, and a microphone 16, a speaker 17, a transmitter 18, and a receiver 19 are connected to the signal processor 13.

In this connection, the portable telephone 3A is a cellular portable telephone in the code division multiple access (SDMA) scheme utilizing the direct sequence (DS) method based on the IS95 standards. Since the portable telephone 3B has the same circuit construction as the portable telephone 3A, the explanation of same is omitted.

The CPU 10 makes the display 11 display various information (for example, inputted telephone numbers, menu items, or calling history and telephone directory) which is inputted with the operation keys 12. In addition, the CPU 10 controls the signal processor 13 in response to the various commands, which are inputted with the operation keys 12, to execute various processing corresponding to commands to make a call or to finish a conversation.

For example, the signal processor 13 performs error correction processing utilizing the cyclic redundancy check (CRC) method and then the convolutional coding processing, on an audio signal which is inputted via the microphone 16 during conversation. Then, it adds a Pseudo Noise (PN) code, performs frequency-spreading, and performs quadrature phase shift keying (QPSK) modulation, in order to produce a transmission symbol stream which is then given to the transmitter 18.

The transmitter 18 performs digital-to-analog conversion processing on the transmission symbol stream, which is supplied from the signal processor 13, in order to produce a transmission signal, and performs frequency conversion on the transmission signal, and amplifies it, in order to transmit the resultant via the antenna 20.

On the other hand, the receiver 19 amplifies the reception signal which is received via the antenna 20, performs the frequency conversion processing and then the analog-to-digital conversion processing, in order to produce a reception symbol stream which is then transmitted to the signal processor 13.

The signal processor 13 performs the QPSK demodulation on the reception symbol stream, which is supplied from the receiver 19, adds the PN code and performs the de-spread spectrum, and further, performs maximum likelihood estimation and the error correction processing utilizing the CRC method, in order to produce an audio signal which is then outputted via the speaker 17.

Further, under the control of the CPU 10, the signal processor 13 transmits a control signal to the base station 2 (FIG. 1) via the transmitter 18 and the antenna 20 to make a call, and also receives a call-arrival signal via the antenna 20 and the receiver 19 and informs the CPU 10 of the call arrival.

In this way, the CPU 10 controls the signal processor 13, so that the portable telephone 3A can perform radio communication with another portable telephone connected to a public circuit network with the transmitter 18, the receiver 19, and the antenna 20 via the base station 20.

In addition, in the portable telephone 3A, the satellite signal S1 which is transmitted from the GPS satellite 4 is received via the GPS antenna 22, GPS reception data is produced by demodulating the satellite signal S1 through the GPS receiver 14, and the data is given to the CPU 10.

Here, the CPU 10 calculates positional information consisting of latitude, longitude, and altitude, which indicates the current position of the portable telephone 3A, based on the GPS reception data D2 received from at least three GPS satellites 4, by the principle of triangle measurement.

Note that, the CPU 10 make the portable telephones 3A and 3B temporally synchronize with the base station 2, based on a system time which is transmitted from the base station 2 (FIG. 1). Thereby, the portable telephones 3A and 3B synchronize with each other, having the same absolute time.

Further, the CPU 10 controls the radio interface for short distance 15, so that the portable telephone 3A performs radio communication with another portable telephone 3B close to it, via the antenna 21. Thereby, the positional information (latitude, longitude, and altitude) indicating the current position of the portable telephone 3A and the time information can be directly transmitted to the portable telephone 3B, which is the companion terminal, within the radio communication area of the bluetooth, not via the base station.

Next, explanations will be concretely made on a distance measuring procedure in which the portable telephone 3A which is the main terminal in the digital portable telephone system 1 measures a distance to a portable telephone 3B which is the companion terminal, and a positional relation detecting procedure in which the main terminal detects a positional relation whether the own terminal and the companion terminal are "getting closer to" or "getting farther from" each other.

Figure 3:
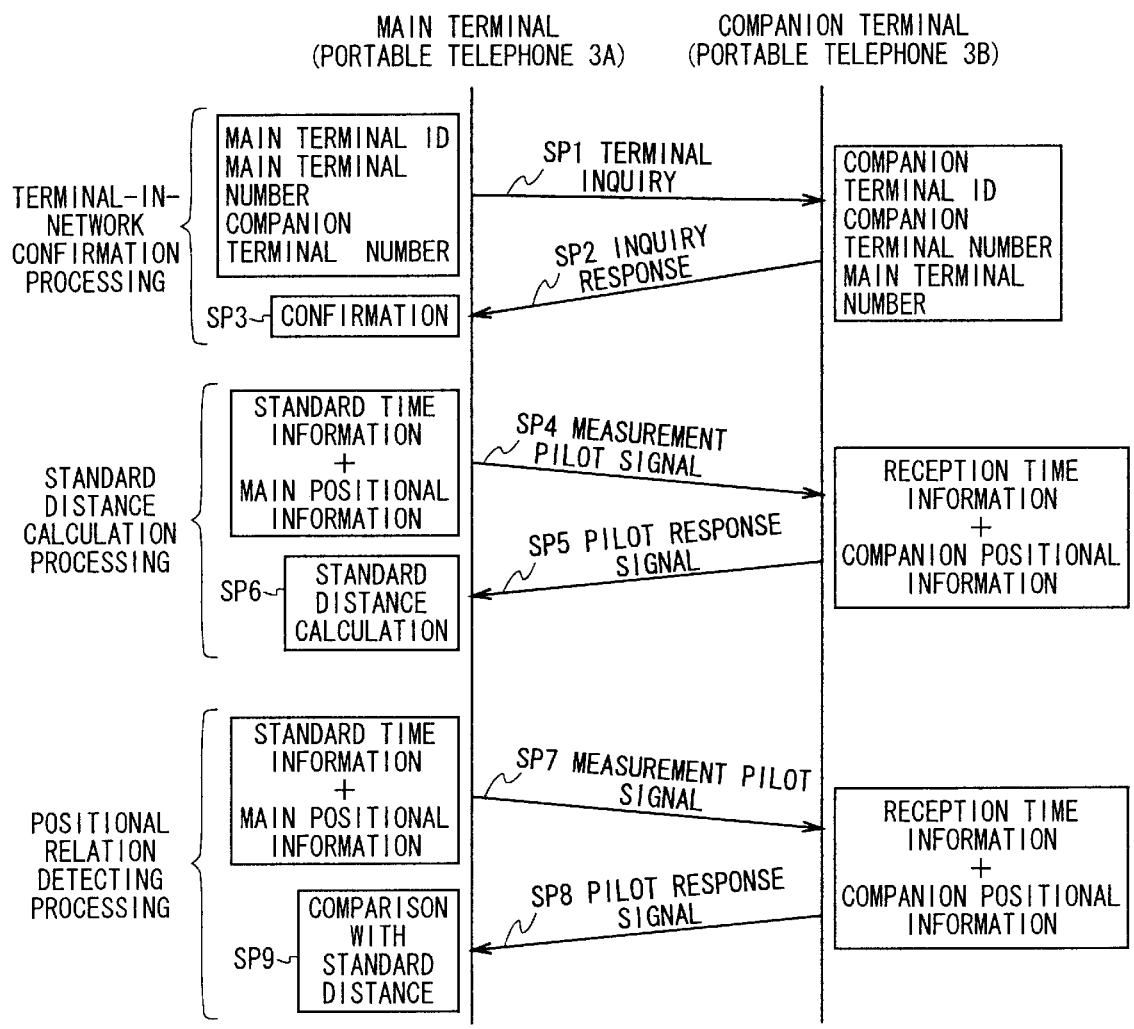
FIG. 3 is a flowchart showing a distance measuring procedure and a positional relation detecting procedure in the first embodiment.

In the digital telephone system 1 as shown in FIG. 3, firstly, at step SP1, the portable telephone 3A, which is the main terminal, transmits to the companion terminal via the radio interface for short distance 15, a terminal inquiry signal comprising the main terminal identification (ID), the main terminal number, and the companion terminal number of the portable telephone 3B, which is the companion terminal, under the control of the CPU 10.

At step SP2, in the case where the portable telephone 3B, which is the companion terminal, receives the terminal inquiry signal, which is transmitted from the portable telephone 3A, when existing within the radio communication area of the bluetooth, and confirms that the companion terminal number is own number, it transmits an inquiry response signal comprising an own terminal ID (hereinafter, referred to as companion terminal ID), an own terminal number (hereinafter, referred to as companion terminal number) and the terminal number of the portable telephone 3A (hereinafter, referred to as main terminal number), to the portable telephone 3A.

At step SP3, the portable telephone 3A, which is the main terminal, receives the inquiry response signal, which is transmitted from the companion terminal, checks the companion terminal ID, the companion terminal number, the main terminal number, with the CPU 10, to confirm that the portable telephone 3B, which is the companion terminal, exists within the radio communication area of the bluetooth, and then terminates the terminal-in-network confirmation processing.

Then, at step SP4, the portable telephone 3A, which is the main terminal, transmits a measurement pilot signal comprising current standard time information in synchronizing with that of the portable telephone 3B, which is the companion terminal, main positional information (latitude, longitude, and altitude) indicating the current position which is calculated based on the GPS reception data D2 received from the GPS satellite 4, to the companion terminal via the radio interface for short distance 15.

At step SP5, the portable telephone 3B, which is the companion terminal, transmits a pilot response signal comprising reception time information indicating the reception time of receiving the measurement pilot signal transmitted from the portable telephone 3A, which is the main terminal, and companion positional information (latitude, longitude, and altitude) indicating the current position of the companion terminal itself, to the main terminal via the radio interface for short distance 15.

At step SP6, the portable telephone 3A, which is the main terminal, calculates a distance between own device and the companion terminal, based on the main positional information and the companion positional information with the CPU 10 functioning as a calculating means, and terminates the standard distance calculation processing.

Then, at step SP7, the portable telephone 3A, which is the main terminal, transmits a measurement pilot signal comprising the current standard time information in synchronizing with that of the companion terminal, and the main positional information indicating the current position of the own terminal itself, to the companion terminal via the radio interface for short distance 15 again.

At step SP8, the portable telephone 3B, which is the companion terminal, transmits a pilot response signal comprising the reception time information of the time when the measurement pilot signal transmitted from the main terminal is received, and the companion positional information on the current position of the companion terminal itself, to the main terminal via the radio interface for short distance 15 again.

At step SP9, the portable telephone 3A, which is the main terminal, calculates a distance between the own terminal and the companion terminal, based on the main positional information and the companion positional information, with the CPU 10 again, and compares the calculated distance to the fist standard distance to detects the change in the distance between the own terminal and the companion terminal, resulting in detecting the distance state whether the own terminal is "getting closer to" or "getting farther from" the companion terminal. Then, the positional relation detecting processing between the main terminal and the companion terminal is terminated.

Note that, thereafter, similarly to the above procedure, the portable telephone 3A, which is the main terminal, can accurately detect the distance state whether the main terminal is "getting closer to" or "getting farther from" the companion terminal every time when repeating the positional relation detecting processing.

As described above, the portable telephone 3A, which is the main terminal, calculates a distance between the own terminal and the companion terminal based on the main positional information and the companion positional information, as a standard distance at step SP6. However, if the portable telephone 3B, which is the companion terminal, can not receive the satellite signal S1 from the GPS satellite 4 and does not hold the companion positional information, the portable telephone 3A may calculate radio wave transmission time based on the standard time information held therein and the reception time information transmitted from the companion terminal, in order to calculate a distance between the own terminal and the companion terminal based on the radio wave transmission time and the radio transmission speed ($3 \times 10^8$ m/sec)

As described above, the portable telephones 3A and 3B perform switching control so as to calculate a standard distance based on the standard time information and the reception time information in the case where the portable telephones 3A and 3B do not hold the main positional information and the companion positional information, and on the other hand, to calculate a standard distance based on the main positional information and the companion positional information in the case where they hold the main positional information and the companion positional information. As a result, if either the main positional information and the companion positional information or the standard time information and the reception time information are held, a distance between the own terminal and the companion terminal can be always calculated.

In the foregoing configuration, the portable telephone 3A, which is the main terminal, firstly transmits a terminal inquiry signal to the portable telephone 3B, which is the companion terminal, via the radio interface for short distance 15, and recognizes that the companion terminal exists within the radio communication area of the bluetooth when receiving the inquiry response signal from the portable telephone 3B, which is the companion terminal.

Then, the portable telephone 3A, which is the main terminal, transmits a measurement pilot signal consisting of the standard time information and the main positional information to the portable telephone 3B, which is the companion terminal, via the radio interface for short distance 15, receives the pilot response signal consisting of the reception time information and the companion positional information of the time when the measurement pilot signal is received, from the portable telephone 3B, which is the companion terminal, and then calculates the standard distance between the own terminal and the companion terminal based on the main positional information and the companion positional information.

Then, the portable telephone 3A, which is the main terminal, calculates a distance between the own terminal and the companion terminal, by repeatedly communicating the measurement pilot signal and the reception processing of the pilot response signal with the companion terminal, in order to detect a distance state between the own terminal and the companion terminal by comparing the calculated distance with the standard distance.

As described above, in the digital portable telephone system 1, the portable telephone 3A, which is the main terminal, and the portable telephone 3B, which is the companion terminal, communicate the terminal inquiry signal and the inquiry response signal with each other via the radio interface for short distance 15, so that it can be easily recognized whether the companion terminal exists within a radio communication area of the bluetooth corresponding to the radio interface for short distance 15.

In addition, in the digital portable telephone system 1, the portable telephone 3A, which is the main terminal, and the portable telephone 3B, which is the companion terminal, communicate the measurement pilot signal and the pilot response signal with each other via the radio interface for short distance 15, so that a distance between the main terminal and the companion terminal can be measured free of charge, not via the base station 2.

Furthermore, in the digital portable system 1, the portable telephone 3A, which is the main terminal, and the portable telephone 3B, which is the companion terminal, repeatedly communicate the measurement pilot signal and the pilot response signal via the radio interface for short distance 15, so that a distance between the main terminal and the companion terminal can be calculated, thus making is possible to accurately detect a distance state between the main terminal and the companion terminal by comparing the current distance between the main terminal and the companion terminal with the standard distance or with a distance just before the calculation.

According to the foregoing configuration, in the digital portable telephone system 1, the portable telephone 3A, which is the main terminal, and the portable telephone 3B, which is the companion terminal, can accurately and easily calculate a distance and a positional relation between the main terminal and the companion terminal via the radio interface for short distance 15, not via the base station 2.

Note that, the aforementioned first embodiment has described the case of calculating the positional information consisting of latitude, longitude, and altitude showing the current positions of the portable telephones 3A and 3B by the principle of triangle measurement, based on the GPS reception data D2 that is obtained by receiving the satellite signal S1 transmitted from the GPS satellite 4. The present invention, however, is not limited to this and the positional information can be calculated by a differential-GPS (D-GPS).

Further, the aforementioned first embodiment has described the case of directly communicating data between the portable telephones 3A and 3B, using the radio interface for short distance 15 as a radio communication means. The present invention, however, is not limited to this and other kinds of radio communication means which are able to handle with the radio communication distance of more than 100 m can be used.

Furthermore, the aforementioned first embodiment has described the case where the portable telephones 3A and 3B are applied as radio communication devices in the present invention. The present invention, however, is not limited to this and can be applied to other kinds of radio communication devices which can be provided with radio communication means, such as a transceiver, a pager and a personal digital assistants (PDA).

(2) Second Embodiment

Figure 4:
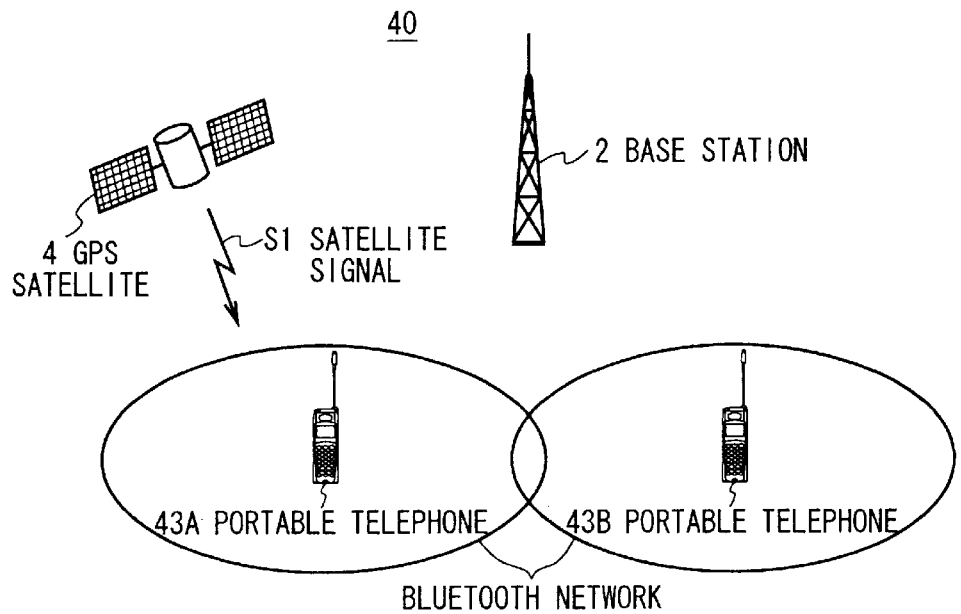
FIG. 4 is a schematic diagram showing the whole configuration of a digital portable telephone system in a second embodiment of the present invention.

As shown in FIG. 4 in which the same reference numerals are applied to parts corresponding to those in FIG. 1, a reference numeral 40 shows a cellular digital portable telephone system as a whole, and is composed of a base station 2 connected to a public circuit network, and digital portable telephones (hereinafter, referred to as portable telephones, simply) 43A and 43B which perform audio communication via the base station 2.

In the digital portable telephone system 40 in the second embodiment, the base station 2 does not transmit a system time to the portable telephones 43A and 43B, and temporally does not synchronize with the portable telephones 43A and 43B, and therefore, the portable telephones 43A and 43B do not synchronize with each other.

Note that, since the circuit configurations of the portable telephones 43A and 43B of this case are the same as those of the portable telephones 3A and 3B in the first embodiment, the explanation of them will be omitted.

Figure 5:
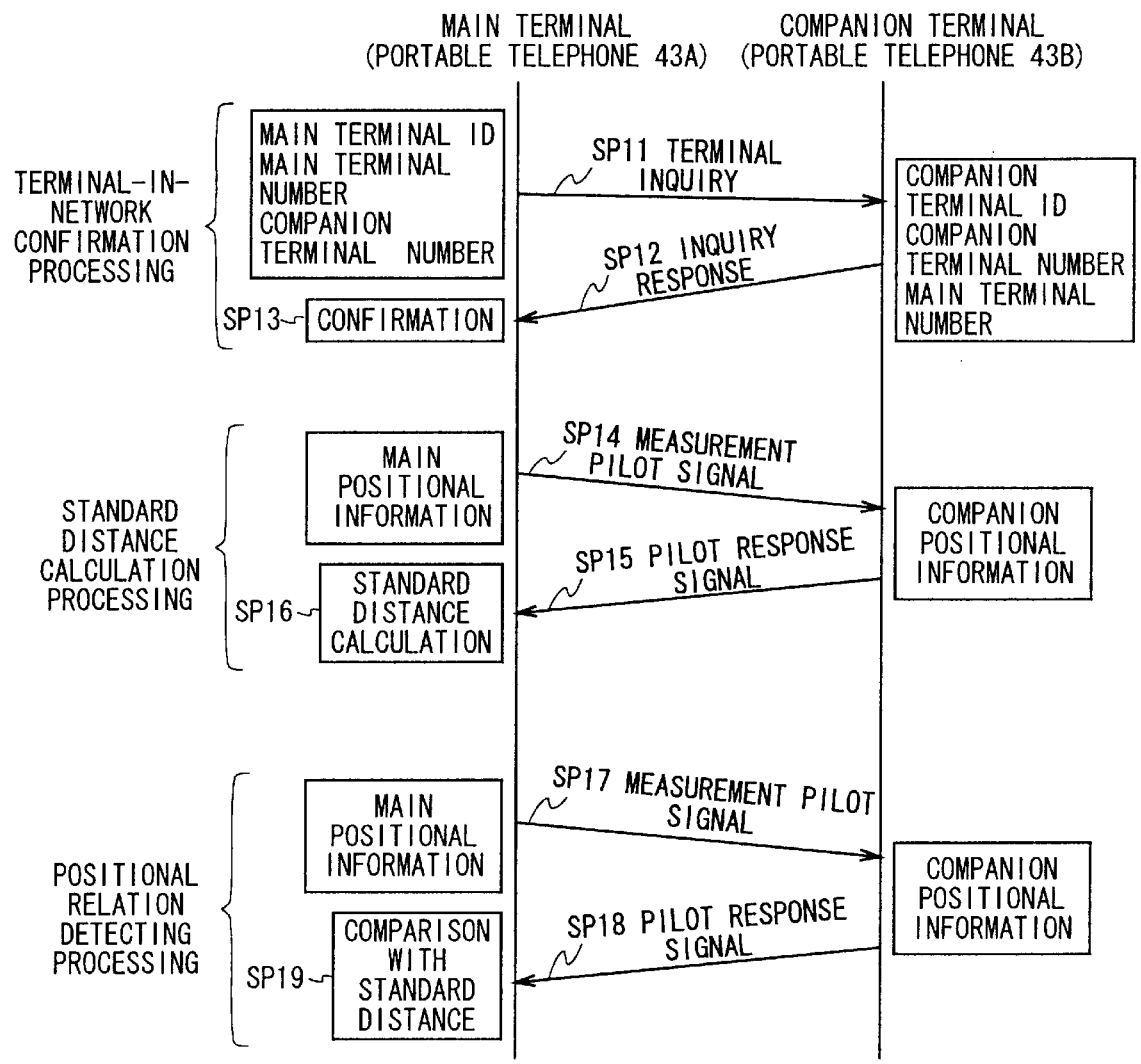
FIG. 5 is a flowchart showing a distance measuring procedure and a positional relation detecting procedure in the second embodiment.

In actual, in the digital portable telephone system 40, as shown in FIG. 5, firstly, at step SP11, the portable telephone 43A, which is the main terminal, transmits a terminal inquiry signal comprising a main terminal identification (ID), a main terminal number and a companion terminal number of the portable telephone 43B, which is the companion terminal, by the CPU 10 via the radio interface for short distance 15, to the companion terminal, similarly to the distance measurement procedure and the positional relation detection procedure in the first embodiment.

At step SP12, the portable telephone 43B, which is the companion terminal, receives the terminal inquiry signal transmitted from the portable telephone 43A when existing within the radio communication area of the bluetooth, and when recognizing that the companion terminal number is the own terminal number, transmits to the portable telephone 43A an inquiry response signal comprising an own terminal ID (hereinafter, referred to as companion terminal ID), an own terminal number (hereinafter, referred to as companion terminal number) and the terminal number of the portable telephone 43A (hereinafter, referred to as main terminal number).

At step SP13, the portable telephone 43A, which is the main terminal, receives the inquiry response signal transmitted from the companion terminal, recognizes the companion terminal ID, the companion terminal number, and the main terminal number to confirm that the portable telephone 43B, which is the companion terminal, exists within the radio communication area of the bluetooth, and then, terminates the terminal-in-network confirmation processing.

Sequentially, at step SP14, the portable telephone 43A, which is the main terminal, transmits main positional information (latitude, longitude, and altitude) representing the current position calculated based on the GPS reception data D2 received from the GPS satellite 4, as a measurement pilot signal via the radio interface for short distance 15 to the companion terminal.

At step SP15, when the portable telephone 43B, which is the companion terminal, receives the measurement pilot signal transmitted form the portable telephone 43A, which is the main terminal, it transmits companion positional information (latitude, longitude, and altitude) representing the current position of the companion terminal itself as a pilot response signal to the main terminal via the radio interface for short distance 15.

At step SP16, the portable telephone 43A, which is the main terminal, calculates a distance between the own terminal and the companion terminal, based on the main positional information and the companion positional information, as a standard distance with the CPU 10 and terminates the standard distance calculation processing.

Next, at step SP17, the portable telephone 43A, which is the main terminal, transmits the main positional information representing the current position of the main terminal itself as a measurement pilot signal to the companion terminal via the radio interface for short distance 15 again.

At step SP18, when the portable telephone 43B, which is the companion terminal, receives the measurement pilot signal transmitted from the main terminal, it transmits the current companion positional information of the companion terminal itself as the pilot response signal via the radio interface for short distance 15 to the main terminal.

At step SP19, the portable telephone 43A, which is the main terminal, calculates a distance between the own terminal and the companion terminal based on the main positional information and the companion terminal information with the CPU 10 again, detects a change in the distance between the own terminal and the companion terminal by comparing the calculated distance to the first standard distance, recognizes the distance state whether the own terminal is "getting closer to" or "getting farther from" the companion terminal, and terminates the positional relation detecting processing between the own terminal and the companion terminal.

In the foregoing configuration, the portable telephone 43A, which is the main terminal, firstly transmits the terminal inquiry signal to the portable telephone 43B, which is the companion terminal, via the radio interface for short distance 15, and when the inquiry response signal is transmitted form the portable telephone 43B, which is the companion terminal, recognizes that the companion terminal exists within the radio communication area of the bluetooth.

Then, the portable telephone 43A, which is the main terminal, transmits the measurement pilot signal representing the main positional information to the portable telephone 43B, which is the companion terminal, via the radio interface for short distance 15, receives the pilot response signal representing the companion positional information from the portable telephone 43B, which is the companion terminal, and calculates the standard distance between the own terminal and the companion terminal based on the main positional information and the companion positional terminal.

Next, the portable telephone 43A, which is the main terminal, calculates a distance between the own terminal and the companion terminal by repeatedly communicating the measurement pilot signal and the reception processing of the pilot response signal with the companion terminal, and detects a distance state between the main terminal and the companion terminal by comparing the calculated distance with the first standard distance.

As described above, in the digital portable telephone system 40, the portable telephone 43A, which is the main terminal, and the portable telephone 43B, which is the companion terminal, communicate the terminal inquiry signal and the inquiry response signal with each other via the radio interface for short distance 15, so that it is easily recognized whether the companion terminal exists within the radio communication area of the bluetooth corresponding to the radio interface for short distance 15.

Further, in the digital portable telephone system 40, the portable telephone 43A, which is the main terminal, and the portable telephone 43B, which is the companion terminal, communicate the measurement pilot signal and the pilot response signal with each other via the radio interface for short distance 15, so that the distance between the main terminal and the companion terminal can be calculated free of charge, not via the base station 2.

Further, in the digital portable telephone system 40, the portable telephone 43A, which is the main terminal, and the portable telephone 43B, which is the companion terminal, communicate the measurement pilot signal and the pilot response signal with each other via the radio interface for short distance 15, so that a distance between the main terminal and the companion terminal can be calculated repeatedly. Thus, the distance state between the main terminal and the companion terminal can be accurately calculated by comparing the current distance between the main terminal and the companion terminal with the standard distance or with a distance just before the calculation.

As described above, in the digital portable telephone system 40, the portable telephone 43A, which is the main terminal, and the portable telephone 43B, which is the companion terminal, communicate the main positional information and the companion positional information with each other via the radio interface for short distance 15, not via the base station 2, so that the distance and the positional relation between the main terminal and the companion terminal can be easily and accurately calculated.

Note that, the aforementioned second embodiment has described the case of calculating the positional information consisting of latitude, longitude, and altitude, representing the current positions of the portable telephones 43A and 43B based on the GPS reception data D2 which is obtained by receiving the satellite signal S1 transmitted from the GPS satellite 4. The present invention, however, is not limited to this and the positional information can be calculated by a differential-GPS (D-GPS).

Further, the second embodiment has described the case where the portable telephones 43A and 43B directly communicate data with each other using the radio interface for short distance 15 as radio communication means. The present invention, however, other kinds of radio communication means which can handle with the radio communication distance of more than 100 m can be used.

Furthermore, the second embodiment has described the case where the portable telephones 43A and 43B are applied as radio communication devices in the present invention. The present invention, however, is not limited to this and can be applied to other various radio communication devices which can be provided with radio communication means, such as a transceiver, a pager and a personal digital assistants (PDA).

(3) Third Embodiment

Figure 6:
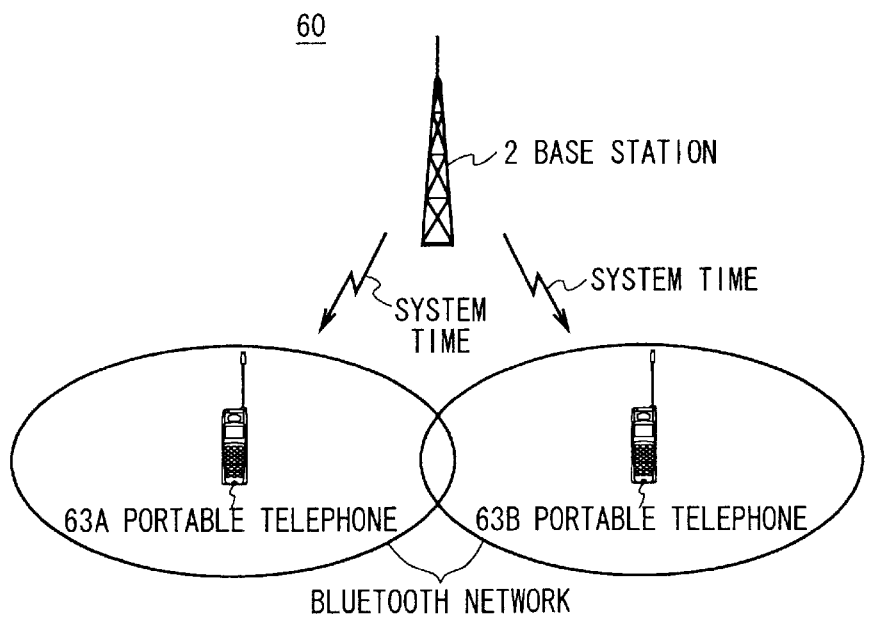
FIG. 6 is a schematic diagram showing the whole configuration of a digital portable telephone system in a third embodiment of the present invention.

As shown in FIG. 6, in which the same reference numerals are applied to parts corresponding to those in FIG. 1, a reference numeral 60 shows a cellular digital portable telephone system, and is configured by a base station 2 connected to a public circuit network, and digital portable telephones (hereinafter, referred to as portable telephones, simply) 63A and 63B which perform audio communication via the base station 2.

The portable telephones 63A and 63B in the third embodiment each does not have the GPS receiver 14 for receiving a satellite signal S1 from the GPS satellite 4, different from the portable telephones 3A and 3B (FIG. 2) in the first embodiment, and are so arranged as to temporally synchronize with the base station 2 based on the system time transmitted from the base station 2, so that the portable telephones 63A and 63B synchronize with each other having the same absolute time.

Therefore, the portable telephone 63A controls the radio interface for short distance 15 by the CPU 10 to perform radio data communication with another portable telephone 63B existing in the vicinity of itself via an antenna 21, so as to directly transmit the standard time information representing the current time, held by the portable telephone 63A itself, to the portable telephone 63B which is the companion terminal, within the radio communication area of the bluetooth, not via the base station 2.

Similarly, the portable telephone 63B controls the radio interface for short distance 15 by the CPU 10, to perform the radio data communication with another portable telephone 63A in the vicinity of itself via the antenna 21, so that the portable telephone 63B can directly transmit the reception time information of the time of receiving data from the portable telephone 63A, to the portable telephone 63A within the radio communication area of the bluetooth, not via the base station 2.

Figure 7:
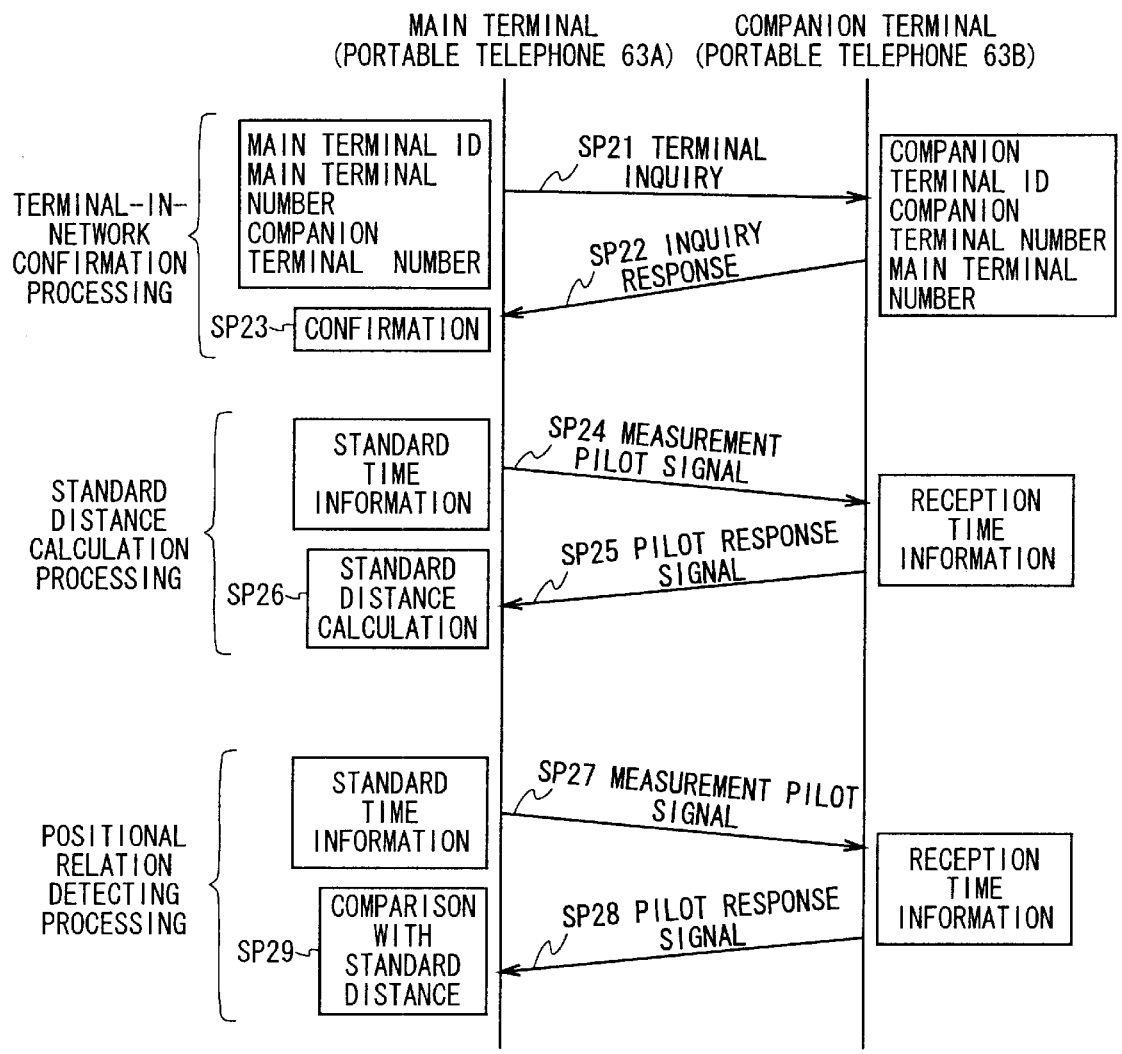
FIG. 7 is a flowchart showing a distance measuring procedure and a positional relation detecting procedure in the third embodiment.

In actual, in the digital portable telephone system 60, similarly to the distance measurement procedure and the positional relation detecting procedure in the first embodiment, as shown in FIG. 7, at step SP21, the portable telephone 63A, which is the main terminal, transmits a terminal inquiry signal comprising a main terminal identification (ID), a main terminal number and a companion terminal number of the portable telephone 63B, which is the companion terminal, to the companion terminal via the radio interface for short distance 15.

At step SP22, when the portable telephone 63B, which is the companion terminal, receives the terminal inquiry signal, which is transmitted from the portable telephone 63A, when existing within the radio communication area of the bluetooth, and recognizes that the companion terminal number is the own terminal number, it transmits an own terminal ID (hereinafter, referred to as a companion terminal ID), an own terminal number (Hereinafter, referred to as companion terminal number) and the terminal umber of the portable telephone 63A (hereinafter, referred to as the main terminal number) as an inquiry response signal to the portable telephone 63A, which is the main terminal.

At step 23, the portable telephone 63A, which is the main terminal, receives the inquiry response signal transmitted from the companion terminal, and confirms the companion terminal ID, the companion terminal number and the main terminal number, recognizes that the portable telephone 63B, which is the companion terminal, exists within the radio communication area of the bluetooth, and terminates the terminal-in-network confirmation processing.

Then, at step SP24, the portable telephone 63A, which is the main terminal, transmits the standard time information representing the current time synchronizing with the system time, to the companion terminal via the radio interface for short distance 15 as a measurement pilot signal.

At step SP25, when the portable telephone 63B, which is the companion terminal, receives the measurement pilot signal transmitted from the portable telephone 63A, which is the main terminal, it transmits reception time information representing the time of receiving the measurement pilot signal as a pilot response signal to the main terminal via the radio interface for short distance 15.

At step SP26, the portable telephone 63A, which is the main terminal, calculates the radio wave transmission time based on the standard time information and the reception time information with the CPU 10, calculates a distance between the main terminal and the companion terminal as a standard distance based on the radio wave transmission time and the radio wave transmission speed ($3 \times 10^8$ m/sec) and terminates the standard distance calculation processing.

Here, the standard time information and the reception time information are calculated by the portable telephones 63A and 63B in a minimum unit of "nsec" order which is the same as the system time, and thereby a standard distance can be accurately calculated based on the radio wave transmission time in the "nsec" order.

Next, at step SP27, the portable telephone 63A, which is the main terminal, transmits the standard time information representing the current time as the measurement pilot signal to the companion terminal via the radio interface for short distance 15 again.

At step SP28, when the portable telephone 43B, which is the companion terminal, receives the measurement pilot signal transmitted from the main terminal, it transmits the reception time information of the time when receiving the measurement pilot signal, as the pilot response signal to the main terminal via the radio interface for short distance 15 again.

At step SP29, the portable telephone 43A, which is the main terminal, calculates a radio wave transmission time based on the standard time information and the reception time information with the CPU 10, calculates a distance between the main terminal and the companion terminal based on the radio wave transmission time and the radio wave transmission speed, and detects a change in the distance between the main terminal and the companion terminal by comparing the calculated distance with the first standard distance, and recognizes whether the main terminal is "getting closer to" or "getting farther from" the companion terminal, and terminates the positional relation detecting processing.

In the foregoing configuration, the portable telephone 63A, which is the main terminal, firstly transmits the terminal inquiry signal to the portable telephone 63B, which is the companion terminal, via the radio interface for short distance 15, and recognizes that the companion terminal exists within the radio communication area of the bluetooth when the inquiry response signal is transmitted from the portable telephone 63B, which is the companion terminal.

Then, the portable telephone 63A, which is the main terminal, transmits the measurement pilot signal being the standard time information to the portable telephone 63B, which is the companion terminal, via the radio interface for short distance 15, receives the pilot response signal being the reception time information transmitted from the portable telephone 63B, which is the companion terminal, and then, calculates a standard distance between the main terminal and the companion terminal based on the radio wave transmission time and the radio wave transmission speed calculated based on the standard time information and the reception time information.

Then, the portable telephone 63A, which is the main terminal, sequentially calculates a distance between the main terminal and the companion terminal by repeatedly communicating the measurement pilot signal and the reception processing of the pilot response signal with the companion terminal, and obtains the distance state between the main terminal and the companion terminal by comparing the calculated distnace with the firstly calculated standard distance or with the distance just before the calculation.

As described above, in the digital portable telephone system 60, the portable telephone 63A, which is the main terminal, and the portable telephone 63B, which is the companion terminal, communicate the terminal inquiry signal and the response signal with each other via the radio interface for short distance 15, so that it can be easily confirmed whether the specific companion terminal exists within the radio communication area of the bluetooth corresponding to the radio interface for short distance 15.

Further, in the digital portable telephone system 60, the portable telephone 63A, which is the main terminal, and the portable telephone 63B, which is the companion terminal, communicate the measurement pilot signal being the standard time information and the response pilot signal being the reception time information with each other via the radio interface for short distance 15, so that a distance between the main terminal and the companion terminal can be calculated free of charge, not via the base station 2.

Furthermore, in the digital portable telephone system 60, the portable telephone 63A, which is the main terminal, and the portable telephone 63B, which is the companion terminal, repeatedly communicate the measurement pilot signal being the standard time information and the response pilot signal being the reception time information with each other via the radio interface for short distance 15, so that the distance between the main terminal and the companion terminal can be repeatedly obtained, resulting in accurately obtaining the distance state between the main terminal and the companion terminal.

As foregoing configuration, in the digital portable telephone system 60, the portable telephone 63A, which is the main terminal, and the portable telephone 63B, which is the companion terminal, communicate the standard time information and the reception time information synchronizing with each other, via the radio interface for short distance 15, not via the base station 2, so that the distance and the positional relation between the main terminal and the companion terminal can be accurately and easily obtained.

Note that, the foregoing third embodiment has described the case of directly communicating data between the portable telephones 63A and 63B using the radio interface for short distance 15 as radio communication means. The preset invention, however, is not limited to this and other various radio communication means which can handle with a radio communication distance of more than 100 m can be used.

Further, the foregoing third embodiment has described the case where the portable telephones 63A and 63B are applied as radio communication devices in the present invention. The present invention, however, is not limited to this and can be applied to other various radio communication devices which can have radio communication means, such as a transceiver, a pager, and a personal digital assistants (PDA).

(4) Fourth Embodiment

Figure 8:
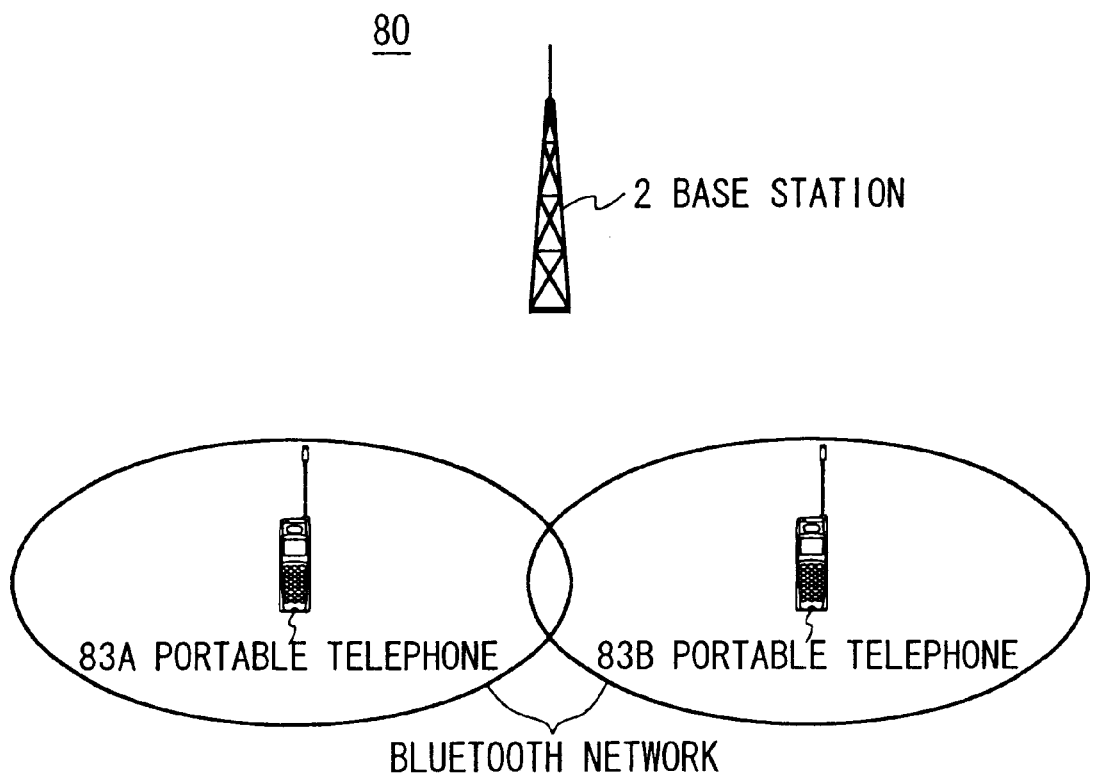
FIG. 8 is a schematic diagram showing the whole configuration of a digital portable telephone system in a fourth embodiment of the present invention.

As shown in FIG. 8 in which the same reference numerals are applied to parts corresponding to those in FIG. 1, a reference numeral 80 shows a cellular digital portable telephone system as a whole, and is configured by a base station 2 connected to a public circuit network, and digital portable telephones 83A and 83B (hereinafter, referred to as portable telephones, simply) which perform audio communication via the base station 2.

Different from the portable telephones 3A and 3B (FIG. 2) in the first embodiment, the portable telephones 83A and 83B in the fourth embodiment each does not have the GPS receiver 14 for receiving a satellite signal S1 from the GPS satellite 4, and in addition, a system time is not transmitted from the base station 2 to the portable telephones 83A and 83B. Therefore, the portable telephones 83A and 83B do not synchronize with each other and do not recognize positional information.

Figure 9:
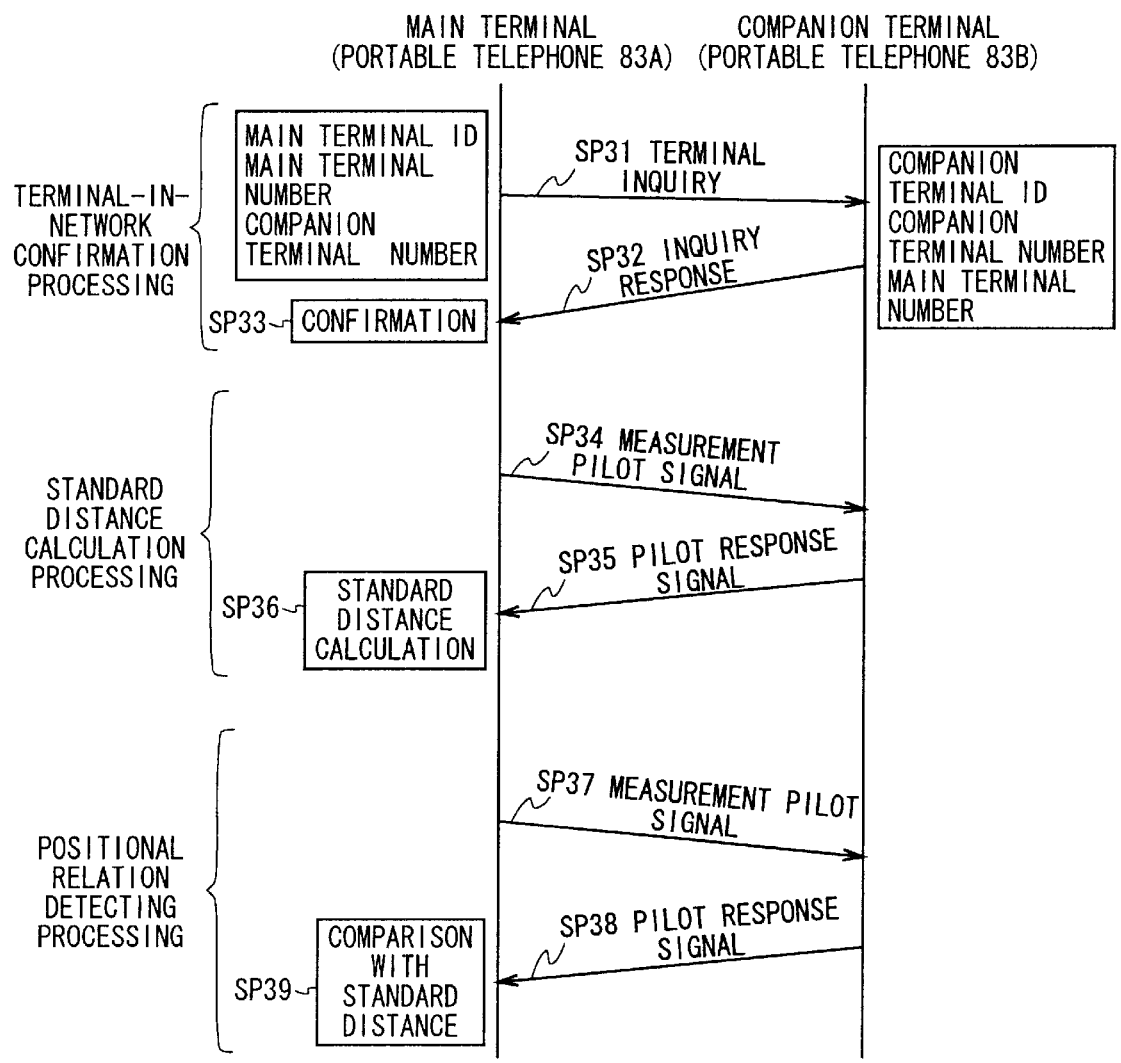
FIG. 9 is a flowchart showing a distance measuring procedure and a positional relation detecting procedure in the fourth embodiment.

In actual, in the digital portable telephone system 80, similarly to the distance measurement procedure and the positional relation detecting procedure in the first embodiment, as shown in FIG. 9, at step SP31, the portable telephone 83A, which is the main terminal, firstly transmits a terminal inquiry signal comprising a main terminal identification (ID), a main terminal number, and a companion terminal number of the portable telephone 83B, which is the companion terminal, with the CPU 10 to the companion terminal via the radio interface for short distance 15.

At step SP32, when the portable telephone 83B, which is the companion terminal, receives the main terminal ID, the main terminal number and the companion terminal number transmitted from the portable telephone 83A when existing within the radio communication area of the bluetooth, and recognizes that the companion terminal number is the own terminal number, it transmits an own terminal ID (hereinafter, referred to as a companion terminal ID), an own terminal number (hereinafter, referred to as a companion terminal number), and the terminal number of the portable telephone 83A (hereinafter, referred to as a main terminal number) as the inquiry response signal to the portable telephone 83A, which is the main terminal.

At step SP33, the portable telephone 83A, which is the main terminal, receives the inquiry response signal transmitted from the companion terminal, recognizes the companion terminal ID, the companion terminal number and the main terminal number to recognize that the portable telephone 83B, which is the companion terminal, exists within the radio communication area of the bluetooth, and terminates the terminal-in-network terminal confirmation processing.

Next, at step SP34, the portable telephone 83A, which is the main terminal, transmits a predetermined measurement pilot signal of, for example, "0,0,0,0" to the companion terminal via the radio interface for short distance 15.

At step SP35, when the portable telephone 83B, which is the companion terminal, receives the measurement pilot signal transmitted from the portable telephone 83A, which is the main terminal, it transmits a predetermined pilot response signal of, for example, "1,1,1,1" to the main terminal via the radio interface for short distance 15.

At step SP36, the portable telephone 83A, which is the main terminal, receives the pilot response signal from the portable telephone 83B, which is the companion terminal, it calculates a communication time from the time of transmitting the measurement pilot signal up to the time of receiving the pilot response signal, recognizes the half of the communication time as a radio wave transmission time from the portable telephone 63A, which is the main terminal, to the portable telephone 63B, which is the companion terminal, calculates the distance between the main terminal and the companion terminal as a standard distance based on the radio wave transmission time and the radio wave transmission speed, and terminates the standard distance calculation processing.

Next, at step SP37, the portable telephone 63A, which is the main terminal, transmits the measurement pilot signal of "0,0,0,0" to the companion terminal via the radio interface for short distance 15 again.

At step SP28, when the portable telephone 43B, which is the companion terminal, receives the measurement pilot signal transmitted from the main terminal, it transmits the pilot response signal of "1,1,1,1" to the main terminal via the radio interface for short distance 15 again.

At step SP29, the portable telephone 43A, which is the main terminal, recognizes the half of the communication time from the time of transmitting the measurement pilot signal up to the time of receiving the pilot response signal as the radio wave transmission time from the main terminal to the companion terminal, calculates a distance between the main terminal and the companion terminal based on the radio wave transmission time and the radio wave transmission speed, detects a change in the distance between the main terminal and the companion terminal by comparing the calculated distance with the first standard distance, to recognize the distance state whether the main terminal is "getting closer to" or "getting farther from" the companion terminal, and terminates the positional relation detecting processing between the own terminal and the companion terminal.

In the foregoing configuration, the portable telephone 83A, which is the main terminal, firstly transmits the terminal inquiry signal to the portable telephone 83B, which is the companion terminal, via the radio interface for short distance 15, and recognizes that the companion terminal exists within the radio communication area of the bluetooth when the inquiry response signal is transmitted from the portable telephone 83B, which is the companion terminal.

Then, the portable telephone 83A, which is the main terminal, transmits the predetermined pilot signal of "0,0,0, 0" to the portable telephone 83B via the radio interface for short distance 15, calculates the radio wave transmission time based on the communication time up to the time of receiving the predetermined pilot response signal of "1,1,1, 1" from the portable telephone 83B, which is the companion terminal, and calculates a standard distance between the main terminal and the companion terminal based on the radio wave transmission time and the radio wave transmission speed.

Then, the portable telephone 83A, which is the main terminal, sequentially calculates a distance between the main terminal and the companion terminal by repeatedly communicating the measurement pilot signal and the reception processing of the pilot response signal with the companion terminal, and obtains the distance state between the main terminal and the companion terminal by comparing the firstly calculated standard distance with the distance just before the calculation.

In this way, in the digital portable telephone system 80, the portable telephone 63A, which is the main terminal, and the portable telephone 63B, which is the companion terminal, communicate the terminal inquiry signal and the inquiry response signal with each other via the radio interface for short distance 15, so that it can be easily confirmed whether the companion terminal exists within the radio communication area of the bluetooth corresponding to the radio interface for short distance 15.

In addition, in the digital portable telephone system 80, the portable telephone 63A, which is the main terminal, and the portable telephone 63B, which is the companion terminal, communicate the measurement pilot signal and the pilot response signal with each other via the radio interface for short distance 15, so that the distance between the main terminal and the companion terminal can be obtained free of charge, not via the base station 2.

Furthermore, in the digital portable telephone system 80, the portable telephone 63A, which is the main terminal, and the portable telephone 63B, which is the companion terminal, repeatedly communicate the measurement pilot signal and the pilot response signal with each other via the radio interface for short distance 15, so as to sequentially obtain a distance between the main terminal and the companion terminal, so that a distance state between the main terminal and the companion terminal can be accurately detected.

According to the forgoing configuration, even if the portable telephone 63A, which is the main terminal, and the portable telephone 63B, which is the companion terminal, do not hold the positional information and the time information synchronizing with each other, they communicate the measurement pilot signal and the pilot response signal with each other via the radio interface for short distance 15, not via the base station 2, so that the distance and the positional relation between the main terminal and the companion terminal can be easily obtained.

Note that, the foregoing forth embodiment has described the case of communicating the measurement pilot signal and the pilot response signal between the portable telephones 83A and 83B using the radio interface for short distance 15 as radio communication means. The present invention, however, is not limited to this and other various radio communication means which can handle with a radio communication distance of more than 100 m can be used.

Further, the foregoing fourth embodiment has described the case where the portable telephones 83A and 83B are applied as radio communication devices in the present invention. The present invention, however, is not limited to this and can be applied to other various kinds of radio communication devices which can have the radio communication means, such as a transceiver, a pager, and a Personal Digital Assistants (PDA).

According to the present invention as described above, a radio communication device directly transmits a predetermined signal used for calculating a distance between the current own position and a target for measurement, via a radio communication means to the target for measurement, receives a response signal in response to the measurement signal from the target for measurement, and calculates a distance between the current position and the target for measurement based on the response signal and the measurement signal. As a result, it is possible to realize a radio communication device and a method of measuring a distance which are capable of detecting a distance and a positional relation between the own device and the target for measurement by directly communicating a measurement signal and a response signal with the target for measurement, not via a base station.

Further, according to the present invention, the radio communication device directly transmits standard time information showing the transmission time toward the target for measurement, to the target for measurement, for calculating a distance between the own current position and the target for measurement, receives the reception time information of the standard time information from the target for measurement and then, calculates the distance between the own current position and the target for measurement based on the standard time information and the reception time information. As a result, a radio communication device and a method of measuring a distance can be realized, which are capable of easily obtaining a distance and a positional relation between the own device and the target for measurement, by directly communicating standard time information and reception time information with the target for measurement, not via a base station.

Furthermore, in the present invention, the radio communication device directly transmits the standard time information showing the transmission time toward the target for measurement, to the target for measurement, for calculating a distance between the own current position and the target for measurement, receives the reception time information of the standard time information, which synchronizes with the standard time information in absolute time, from the target for measurement and then, calculates the distance between the current position and the target for measurement based on the standard time information and the reception time information. As a result, a radio communication device and a method of measuring a distance can be realized, which are capable of accurately and easily obtaining a distance and a positional relation between the own device and a target for measurement by directly communicating standard time information and reception time information, which synchronize with each other, with the target for measurement, not via a base station.

While there has been described in connection with the preferred embodiments of the invention, it will be obvious tot hose skilled in the art that various changes and modifications may be aimed, therefore, to cover in the appended claims all such changes and modifications as fall within the true spirit and scope of the invention.

What is claimed is:

1. A radio communication device comprising:
    cellular communication means for communicating with an other radio communication device;
    radio communication means for directly transmitting a predetermined measurement signal to a target for measurement, said predetermined measurement signal being used for calculating a distance between a current position of said device and said target for measurement; and calculating means for calculating said distance between said current position and said target for measurement based on a response signal transmitted from said target for measurement and said predetermined measurement signal after said radio communication means receives said response signal in response to said measurement signal.

2. The radio communication device according to claim 1, wherein:

said predetermined measurement signal is main positional information based on a global positioning system (GPS) representing said current position of said radio communication device; and said response signal is companion positional information based on said GPS representing a current position of said target for measurement.

3. The radio communication device according to claim 1, wherein:

said measurement signal is standard time information representing a transmission time when said radio communication device directly transmits to said target for measurement; and said response signal is reception time information representing a reception time when said target for measurement receives said predetermined measurement signal from said radio communication device.

4. The radio communication device according to claim 3, wherein said standard time information and said reception time information synchronize in absolute time.

5. The radio communication device according to claim 1, wherein said calculating means obtains a positional relation between said radio communication device and said target for measurement by comparing said distance calculated with a distance calculated just before said calculation.

6. A distance measuring method comprising the steps of:

directly transmitting a predetermined measurement signal from a radio communication device that includes cellular communication means for communicating with an other radio communication device to a target for measurement via radio communication means, said predetermined measurement signal being used for calculating a distance between a current position of said radio communication device and said target for measurement; and calculating said distance between said current position and said target for measurement based on a response signal transmitted from said target for measurement and said predetermined measurement signal, after receiving said response signal in response to said measurement signal.

7. The distance measuring method according to claim 6, wherein:

said predetermined measurement signal is main positional information based on a global positioning system (GPS) representing said current position of said radio communication device; and said response signal is companion positional information based on said GPS representing a current position of said target for measurement.

8. The distance measuring method according to claim 6, wherein:

said measurement signal is standard time information representing a transmission time when said radio communication device directly transmits said predetermined measurement signal to said target for measurement; and said response signal is reception time information representing a reception time when said target for measurement receives said predetermined measurement signal from said radio communication device.

9. The distance measuring method according to claim 8, wherein said standard time information and said reception time information synchronize in absolute time.

10. The distance measuring method according to claim 8, wherein said calculating means obtains a positional relation between said radio communication device and said target for measurement by comparing said distance calculated with a distance calculated just before calculation.

11. A radio communication device comprising:

cellular communication means for communicating with an other radio communication device;

radio communicating means for directly transmitting standard time information to a target for measurement, said standard time information representing a transmission time toward said target for measurement and being used for calculating a distance between a current position of said device and said target for measurement; and calculating means for calculating said distance between said current position and said target for measurement based on said standard time information and reception time information transmitted from said target for measurement, after said radio communicating means receives said reception time information of said standard time information.

12. A distance measuring method comprising the steps of:

directly transmitting standard time information to a target for measurement, said standard time information representing a transmission time to said target for measurement and being used for calculating a distance between a current position of a radio communication device that includes cellular communication means for communicating with an other radio communication device and said target for measurement; and calculating said distance between said current position and said target for measurement based on said standard time information and reception time information transmitted from said target for measurement, after receiving said reception time information of said standard time information.

13. A radio communication device comprising:

cellular communication means for communicating with an other radio communication device;

radio communication means for directly transmitting standard time information to a target for measurement, said standard time information showing a transmission time to said target for measurement and being used for calculating a distance between a current position of said device and said target for measurement; and calculating means for calculating said distance between said current position and said target for measurement based on said standard time information and reception time information after said radio communication means receives said reception time information of said standard time information, which synchronizes with said standard time information in absolute time, from said target for measurement.

14. A distance measuring method comprising the steps of:

directly transmitting standard time information to a target for management, said standard time information showing a transmission time to said target for measurement and being used for calculating a distance between a current position of a radio communication device that includes cellular communication means for communicating with an other radio communication device and said target for measurement; and calculating said distance between said current position and said target for measurement based on said standard time information and reception time information after receiving said reception time information of said standard time information, which synchronizes with said standard time information in absolute time, from said target for measurement.

* * * * *